United States Patent [19]

Adelmann

[11] Patent Number: 5,564,252
[45] Date of Patent: Oct. 15, 1996

[54] DUAL WEB INTERMITTENT MOTION PACKAGING MACHINE

[76] Inventor: Jeffrey H. Adelmann, 8 Midvale Dr., Warren, N.J. 07059

[21] Appl. No.: 507,821

[22] Filed: Jul. 27, 1995

[51] Int. Cl.⁶ .............................. B65B 9/08; B65B 51/30; B65B 43/04
[52] U.S. Cl. .............................. 53/202; 53/51; 53/386.1; 53/389.3; 53/562
[58] Field of Search .............................. 53/202, 562, 546, 53/455, 468, 469, 386.1, 385.1, 384.1, 389.3, 51

[56] References Cited

U.S. PATENT DOCUMENTS

| | | | |
|---|---|---|---|
| 3,581,457 | 6/1971 | Gerlach et al. | 53/202 X |
| 3,596,428 | 8/1971 | Young et al. | 53/562 X |
| 4,035,984 | 7/1977 | Gerlach et al. | 53/202 X |
| 4,269,016 | 5/1981 | Kopp et al. | 53/202 X |
| 4,448,010 | 5/1984 | Stohlquist et al. | 53/562 X |
| 4,662,978 | 5/1987 | Oki | 53/477 X |
| 4,733,517 | 3/1988 | Araki | 53/202 X |
| 4,899,520 | 2/1990 | Lerner et al. | 53/202 X |
| 5,058,364 | 10/1991 | Seiden et al. | 53/562 X |
| 5,080,747 | 1/1992 | Veix | 53/562 X |
| 5,155,979 | 10/1992 | McDonald | 53/202 X |
| 5,235,794 | 8/1993 | Center | 53/202 X |
| 5,236,543 | 8/1993 | Riedel | 53/202 X |
| 5,369,941 | 12/1994 | Rapparini | 53/546 |

*Primary Examiner*—James F. Coan
*Attorney, Agent, or Firm*—Kenneth P. Glynn

[57] ABSTRACT

A dual web, intermittent motion packaging machine consisting of two webs being pulled by a dual web feeder roller unit through a dual side heat sealing device and a dual bag cutting device for forming two sets of bags. The dual web feeder roller device is driven by an assembly of new shafts, clutches, electromagnetic brakes and gears so as to provide for adjustment in pulling the dual webs. The web feeder roller units are adjusted to main synchronization between the two webs. The bags are carried by a dual bag clamping device attached, preferably, to an endless horizontal indexing chain.

20 Claims, 6 Drawing Sheets

DUAL WEB INTERMITTENT MOTION PACKAGING MACHINE

BACKGROUND OF THE INVENTION

1. Field of the Invention

The invention concerns a packaging machine that simultaneously processes two webs of packaging materials.

2. Information Disclosure Statement

Packaging machines are well known and come in a variety of configurations for achieving various packaging objectives. The single packaging machines generally wrap one article at a time or use an intricate folding method for the wrapping material to wrap two articles at a time. Other machines attempt to increase packaging production by basically combining two machines with one conveyor feed system. The following patents represent the variations on packaging machines which exemplify the art:

U.S. Pat. No. 3,581,457 issued to Gerlach concerns a wrapping machine in which a package is formed by transversely curling a single web, to enclose two laterally aligned and spaced articles, without overlapping the free edges of the web. Both edges are longitudinally sealed and then the web is transversely sealed and severed so that the finished package contains two individually enclosed articles.

U.S. Pat. No. 4,035,984 issued to Gerlach et al. concerns a machine for packaging a twin row of articles in a web of wrapping material by moving longitudinally and transversely, pairs of articles along two rows onto a moving web of wrapping material which is then folded over the articles to form two parallel tubes of articles with the longitudinal edge portions and a central portion of the web disposed between the tubes.

U.S. Pat. No. 4,269,016 issued to Kopp et al. concerns an apparatus where two separate streams of bags are formed. The successive bags of each stream are alternately deposited on two side-by-side tracks of conveyor, thus obtaining four partial streams of bags which are then successively conveyed to filling, sealing and discharge stations.

U.S. Pat. No. 4,662,978 issued to Oki concerns a transverse sealing mechanism for use in producing bag-packed products by packing products in tubular film. The device has a compression mechanism which provides for compression pressure on transversely sealed portions and a forcibly cooled cutting device which applies infinite compressive force to the compressed, cooled and cut region of the transversely sealed portion.

U.S. Pat. No. 5,058,364 issued to Seiden et al. discloses an intermittent motion packaging machine where pouches in an interconnected strip are advanced edgewise to a cut-off station where the leading pouch is severed from the strip, transferred to two opposing pouch clamps on two different chains and advanced broadwise through a filling station. Before being filled, the pouches are opened by shifting portions of the inboard runs of the two chains laterally toward one another, and by pulling the side panels of the pouch away from one another with suction cups.

U.S. Pat. No. 5,080,747 issued to Veix concerns a heat sealing mechanism with movable bars. Heat seal bars are located on opposite sides of an elongated strip of heat sealable material adapted to be advanced in a step by step motion. When the strip dwells, the bars are shifted linearly inwardly into engagement with the strip to form a heat seal and then the bars are retracted linearly away from the strip.

U.S. Pat. No. 5,155,979 issued to McDonald concerns a form-fill-seal apparatus for simultaneously packaging two streams of articles. A sheet of packaging material is brought around adjacent articles with a central portion of the material being passed between the streams of articles and between outer edge portions of the packaging material. The packaging material is sealed through the combined thicknesses of its central portion and its edge portions without introducing a sealing device between the articles.

U.S. Pat. No. 5,236,543 issued to Reidel concerns an apparatus for welding the sealing seam on a package which consists, at least partially, of synthetic plastics coated paper, comprising a welding tool having dies and counter dies, and a support and drive means to generate the pressure force.

U.S. Pat. No. 5,369,941 issued to Repparini relates to a packaging machine made up of two vertical packaging groups set on opposite sides of a central structure equipped with a horizontal bilateral station that carries out the transversal sealing of both resulting packets.

Notwithstanding the prior art in this field, it is believed that the present invention, which retrofit's existing single web intermittent motion packaging machines into dual web intermittent motion packaging machines in the particular fashion described herein, is neither taught nor rendered obvious.

SUMMARY OF THE INVENTION

It is an object of the present invention to provide a packaging machine that can simultaneously operate two web rolls of package materials. More particularly, pouch material from two web rolls is simultaneously folded, heat sealed at the sides, cut into bags with an open top, held by bag clamps which pass through operating stations that open the bags, fill the bags, top seal the bags, and pick off the completed bags from the bag clamps.

Another object of the invention is to teach a method for improving or modifying prior art single web packaging machines to attain the dual web packaging capability.

The invention is a combination of components which simultaneously perform operations such as shaping, sidewall sealing, cutting, opening, filling and top sealing to form two bag or pouch packages. The machine employs roll holders for unwinding two web sources through folding devices to create webs having substantially vertical walls and a folded bottom. The folded web is side sealed by a heat device to form bag segments which are pulled by web feeder rollers past a bag cutting device. The segmented web is cut at the side heat seals to form separate bags which are retrieved by a bag clamp device suspended from a moving endless chain. The bag clamp device moves the bags along an air jet blade for opening the top edges of the bag. The opened bags are then brought to filling devices which dispense a predetermined amount of material into the bags. The filled bags are then carried past a heat sealing device where the tops of the bags are sealed. Upon being sealed, the bags are then retrieved for shipment or inventory handling.

To achieve the dual web packaging capability, various components of the prior art single web machine are modified or completely replaced with new features. The existing motor shaft is truncated to accommodate a dual set of web feed roller shafts having clutches and electromagnetic brakes. The electromagnetic brakes are activated by a photoelectric eye for adjusting the speeds of a leading web at any time to assure simultaneous movement of both webs. The single bag clamp device is replaced by two such bag clamp units attached to a new bracket suspended from the endless belt so as to allow simultaneous processing of both bags for filling and top sealing. The heat seal units, both side and top, are modified to utilize the existing heat seal bars with a central two sided heat seal bar to permit heat sealing of two bags simultaneously. A photoelectric eye can be utilized to monitor movement of the two segmented webs before cutting to assure that the segmented webs are progressing through the machine simultaneously. If one of the segmented webs lags behind the other segmented web, the photoelectric eye can detect such asynchronous movement and activate the electromagnetic brakes of the other segmented web to allow the lagging segmented web to synchronize with the other segmented web. The endless belt utilized is preferably an indexing chain. The main shaft may include cams and other advancing segments for activating the dual air jet blades, bag opening device, and dual filling device.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

Figure 1:
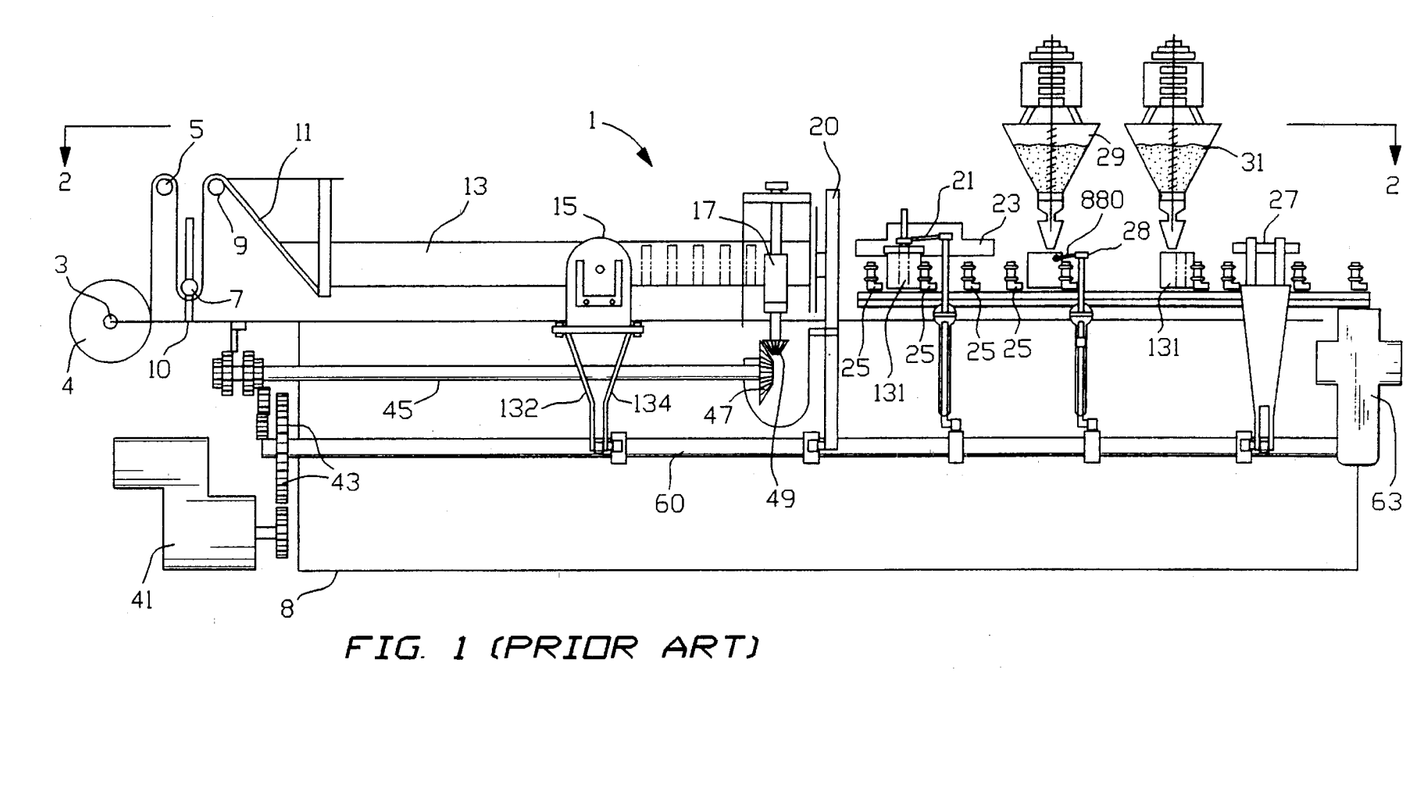
FIG. 1 is a side view of a prior art single web intermittent motion packaging machine.
Figure 2:
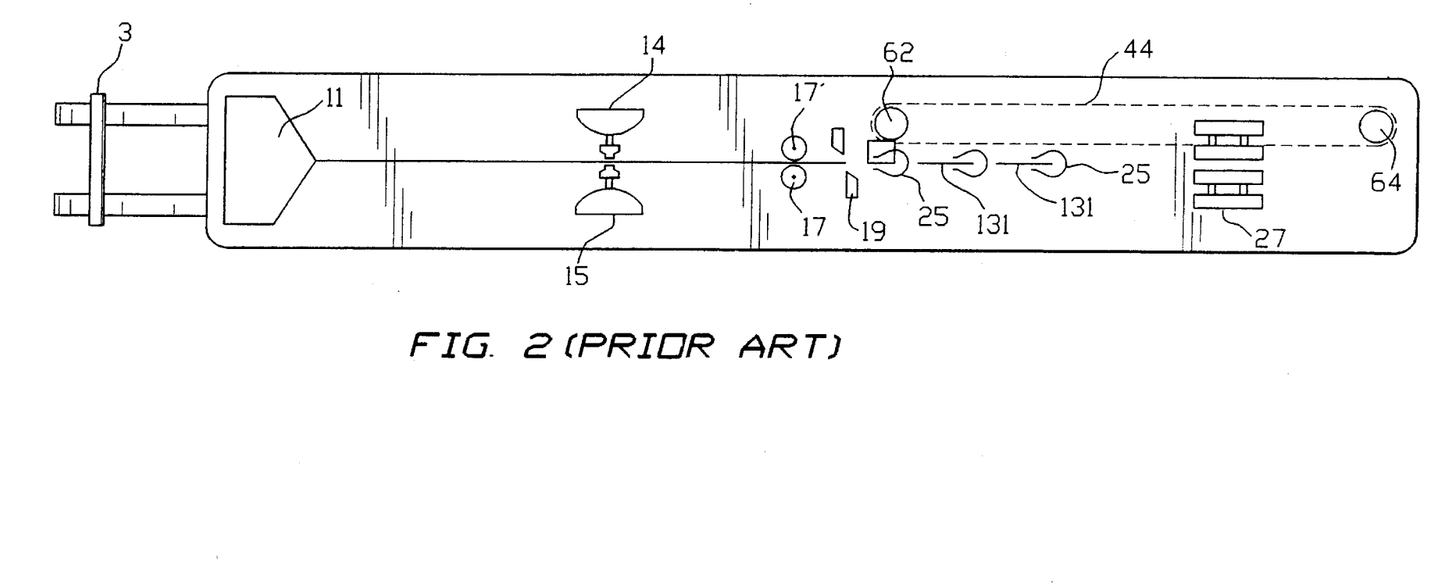
FIG. 2 is a top view of FIG. 1.

Shown in FIGS. 1 and 2 are top and side views of a prior art, single web, intermittent motion packaging machine 1, having a base 8 and horizontal support surface 10 for mounting various components. A web or packaging material 4 is unwound from a web roll holder device 3 through guide rollers 5, 7 and 9, past a web folding device 11 by the pulling action of a web feed roller 17. The web feed roller 17, in contact with an idler roller 17', has a shaft with a bevel gear 49, that is driven by a bevel gear 47 on a drive shaft 45. Drive shaft 45 is rotated by a gear assembly 43, a combination of rotating gears, which is in turn driven by power means 41. Power means 41, is typically an electric motor with a gear reduction assembly. Power means 41 also, via gear assembly 43, rotates the main drive shaft 60. The main drive shaft 60 has cams and other advancing segments for operating side heat sealing unit 15, bag cutting device 19, bag holder 21, air jet blade 23, top heat sealing unit 27, bag clamp device 28 and is connected to gear control box 63.

The web folding device 11 is a stationary mechanical shaper that has a flat base upstream which graduates to a "V" shape and then to a vertical wall shape to fold the web 4 into vertical walls with a solid folded bottom. The folded web 13 is pulled through the side heat sealing unit 15 which fuses or melts the two vertical walls of the folded web 4 at a predetermined horizontal spacing to form separate bag segments. The segmented web 13 is then pulled by the web feeder roller unit 17 past the bag cutting device 19 a predetermined distance so as to align the side seal of the folded web 4 with blades of the cutting device 19 to form separate pouches or bags 13'. As the bags 13' are cut, they are retrieved by a bag clamping unit 25.

The bag clamping unit 25 may be, and in this embodiment is connected at its bottom to a horizontal endless belt or chain 44 that is rotated by a sprocket 64 and a return sprocket 62. The sprocket 64 is connected by way of a cylindrical shaft to a gear control box 63, which in turn is driven by the main shaft 60. The bags 13' are carried past an air jet blade 23 which discharges air to the top of the bag 13' so as to separate the top edges of the bag 13' and allow the bag edge holder 21 to open the bag 13' more. The partially opened bag 13' is then carried by the bag clamp unit 25 to a first singular filling station or device 29, where an air bag opening device 28 pulls the sides of the bag 13' sufficiently apart for the first filling device to discharge material into the bag 13'. Shown is a second singular filling device 31 which is used to fill another bag 13' while the first singular filling device 29 is filling a bag 13'. the filled bag 13' is then carried past the top heat sealing unit 27 where the open bag 13' is heat sealed shut at the top to contain the contents in the bag 13'. After being completely sealed, the bag 13' is retrieved away for shipment processing.

Figure 3:
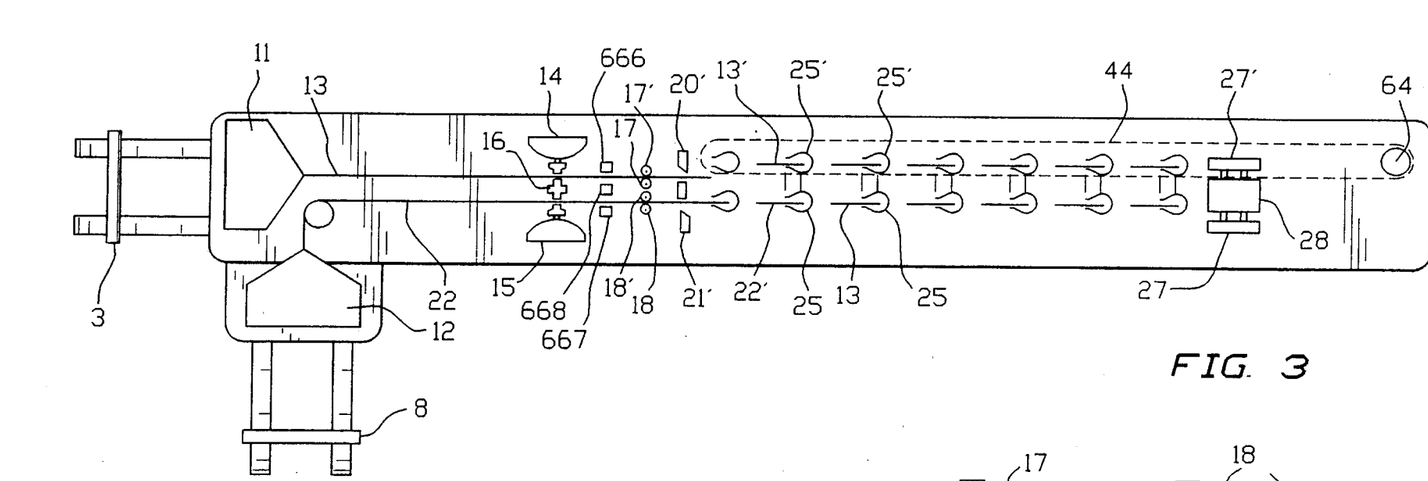
FIG. 3 is a top view of a dual web intermittent motion packaging machine.

Shown in FIG. 3 is a top view of how the typical prior art device depicted in FIGS. 1 and 2 can be improved or modified to create a dual web, intermittent motion packaging machine. A second web roll holder 8 feeds a second web 22 that is pulled by a second web roll feeder unit having an idler roller 18' and a driver roller 18. The second web is folded by a second folding device 12 to form a folded web 22 similar to the first web 13. The first and second webs 13 and 22 are pulled through a modified side heat sealing unit having exterior side bars 14 and 15 and a central two sided heat bar 16 for simultaneously heat sealing both folded webs 13 and 22 at a predetermined interval to establish two lengths of bag segments.

The first and second segmented webs 13 and 22 are then pushed past a dual web cutting device 20' having exterior blades 20 and 20' and a central blade 24 for simultaneously cutting the first web 13 and the second web 22 to form separated open top bags 13' and 22'. As the segmented webs 13 and 22 are cut, they are retrieved by a set of dual bag clamp units 25' and 25, respectively. These dual bag clamps 25' and 25 are commonly connected at the bottom to an endless belt or chain 44. As the endless belt 44 rotates, the bag clamps carry bags 13' and 22' through modified stations for opening, filling, top sealing and retrieval for shipment processing. The endless belt is preferably an indexing chain. The main shaft 60 may have cams and other types of advancing segments for mechanically or electrically readying or activating the modified stations when the bag clamp units are in an appropriate position along the modified station path. The segmented bags may, in some embodiments, be moved between a photoelectric eye device consisting of light transmitters 666 and 667 and a central two sided light receiver 668 to assure that the two rows of segmented bags are synchronized and simultaneously cut at the side seals. The light transmissivity of the side seals is distinct from that of the folded web vertical walls. This distinction can be used to detect with the photoelectric eye if the two web segments are not in synchronization. In a preferred embodiment, the photoelectric eye may be used to detect predetermined marks on the segmented bags to adjust the web feeder roller units to assure synchronous movement of the two webs 13 and 22. Employing a logic circuit at the power means 41, the two electric signals from the photoelectric eye, transmitter 666 to receiver 668 and transmitter 667 to receiver 668, can be used to generate appropriate signals to the electromagnetic brakes 119 and 121 to adjust the position of either segmented web by momentarily halting rotation of the appropriate web feeder roller 17 or 18. In yet other preferred embodiments, the receiver 668 may be omitted and the transmitters 666 and 667 may be transceivers which transmit as well as receive light waves. In such an embodiment, the transceivers could detect the leading edges of the segmented bags by the reflectance of the segmented bags.

Figure 4:
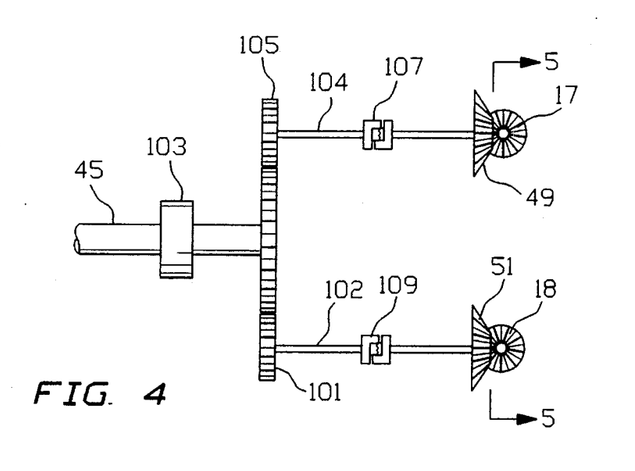
FIG. 4 is a top view of a drive train assembly for a dual web, feed roller system.

FIG. 4 illustrates a drive train assembly for a dual web feeder roller unit. First, shaft 45, from the prior art machine, is truncated to accommodate the dual web feeder roller unit. A shaft coupling 103 is interconnected between the shaft 45 and gear 108. Gear 108 drives gears 101 and 105 in the same rotational directions. The first gear 105 is connected to a bevel gear 49 through a new shaft 104 having a clutch 107. The second gear 101 is connected to a second bevel gear 51 through a second new shaft 102 having a clutch 109. Bevel gear 49 drives web feeder roller unit 17 and the second bevel gear 51 drives web feeder roller unit 18.

Figure 5:
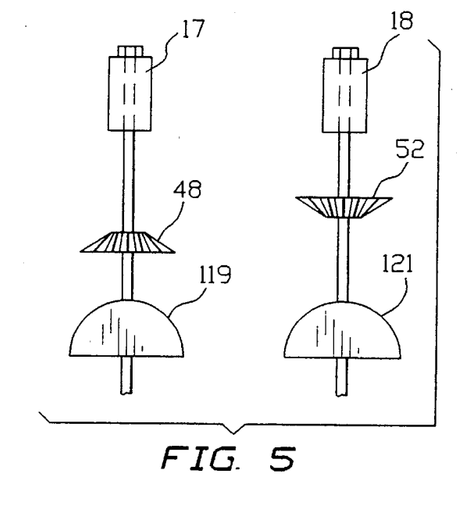
FIG. 5 is a side view of dual web feed roller connected to the drive train assembly in FIG. 4.

FIG. 5 is a side view of the web feeder roller units in FIG. 4. Bevel gear 48 is on a shaft of web feeder roller unit 17 and bevel gear 52 is on a shaft of web feeder roller unit 18. Bevel gears 48 and 52 are connected to bevel gears 49 and 51 in a manner so as to turn web feeder roller units 17 and 18 in the opposite direction when gears 101 and 105 are turning in the same direction. Web feeder roller unit 17 has a first electromagnetic brake 149 which when electrically activated will halt rotation of web feeder roller unit 17. A clutch 107 on new shaft 104 will provide slippage to prevent damage to power means 41, shafts and gears. Similarly, electromagnetic brake 121 will halt rotation of web feeder roller unit 18 and clutch 109 on new shaft 102 will provide slippage. This slippage feature allows one of the web feeder roller units to be stopped so as to synchronize the movement of both segmented webs 13 and 22 through the side heat sealing units and bag cutting device.

Figure 6:
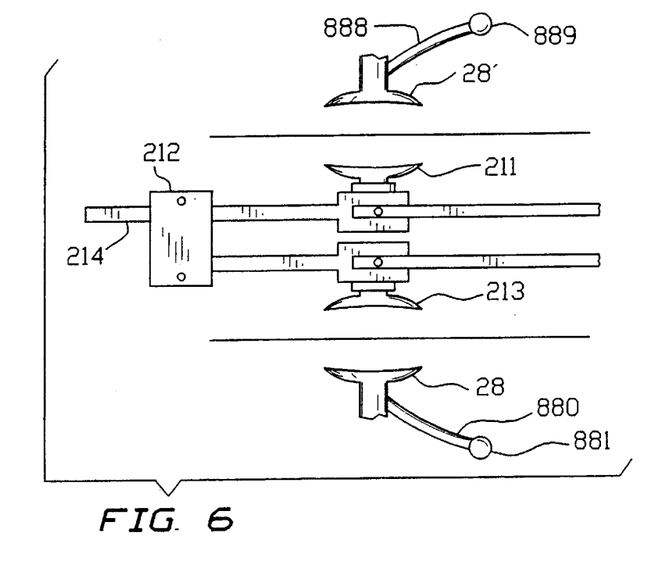
FIG. 6 is a top view of a bag opening device for the dual web packaging machine.

FIG. 6 is a top view of a bag opening device for the dual web packaging machine. The original bag 13' is opened by the pull of a central suction cup 211 and an external suction cup 28' when the suction cup 28' is moved toward the bag 13' by holding bar 888 turning on pivot bar 889. The second bag 22' is opened by the pull of a central suction cup 213 and external suction cup 28 when the suction cup 28 is moved toward the bag 22' by holding bar 880 turning on pivot bar 881. Shown is a vacuum line 214 connected to suction cups 211 and 213 by way of a manifold 212. Suction cups 28 and 28' are also connected to a vacuum line (not shown). As each bag 13' and 22' approaches by way of the bag clamp units 25' and 25, the bag opening device is activated by the introduction of negative air pressure to the suction cups 28, 28', 211 and 213 and the rotation of holder bars 880 and 888 toward bags 13' and 22' to pull the walls of the bags 13' and 22' apart during the filling of materials from the filling devices (not shown).

Figure 7:
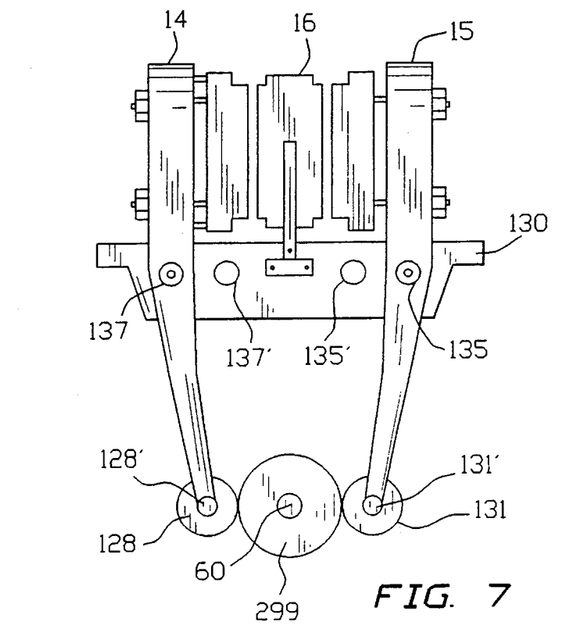
FIG. 7 is a side view of a dual side heat sealing assembly.

Shown in FIG. 7 is a side view of a dual side heat sealing device or assembly for the dual web packaging machine. The common central heat seal unit 16 is stationary while the existing side heat sealing units 14 and 15 move against and retract away from the central heat sealing bar 16 during operation. The existing heat sealing units 14 and 15 are attached to pivot arms 132 and 134, respectively, which are biased by a cam follower spring 138 against an existing cam 299 on shaft 60. To accommodate the increased width between side heat sealing units 14 and 15, pivot arms 132 and 134 are transferred from the existing pivot bearing holes 137' and 135' to new pivot bearing holes 137 and 135 on the existing mounting bracket 130. To maintain proper cam action on the pivot arms, after moving the pivot arms to the new pivot bearing holes, the existing centrics 128' and 131' are replaced with larger centrics 128 and 131.

Figure 8:
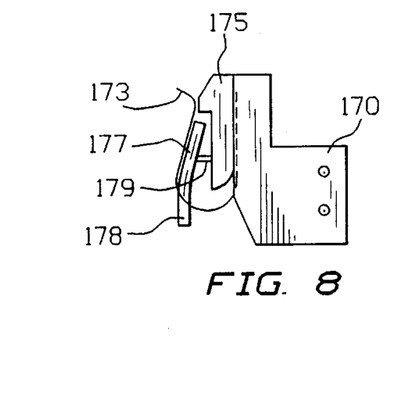
FIG. 8 is a top view of a single web bag clamp.
Figure 9:
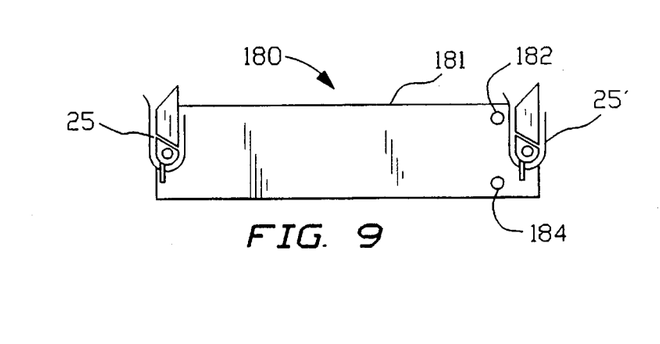
FIG. 9 is a top view of a dual bag clamp for a dual web packing machine.

Shown are top views of a prior art bag clamp device 172, FIG. 8, and a dual bag clamp device 180, FIG. 9. A vertical support body 175 is attached to a horizontal support body 170 which is connected to the horizontal endless belt 44. A pivoting cam rod 177 is attached to the vertical support body 175 by way of a connector 179. Wrapped around the pivoting cam rod 177 and vertical support body 175 is a pincer spring, 173, which is attached to the vertical support body 175. The pincer spring 173 is biased against the vertical support body 175 as shown. In a typical operation, when the bag clamp device must retrieve a bag 13', a lever (not shown) pushes against a protruding portion 178 to force the unattached side of the pincer spring 173 away from the vertical support body 175 to allow the web feeder roller unit 17 to push a cut bag 13' into the retracted pincer spring 173. To grasp the inserted bag 13', the protruding portion 178 is released to allow the pincer spring 173 to return against the vertical support body 175. For the dual web packing machine a modified horizontal support body 181, FIG. 9, has two bag clamp devices 25 and 25' of the type depicted in FIG. 8. The horizontal support body 181 has holes 182 and 184 for attachment to the endless drive chain 45 such that bag clamp device 25' is positioned inside the endless belt chain loop and bag clamp device 25 is outside the loop.

Figure 10:
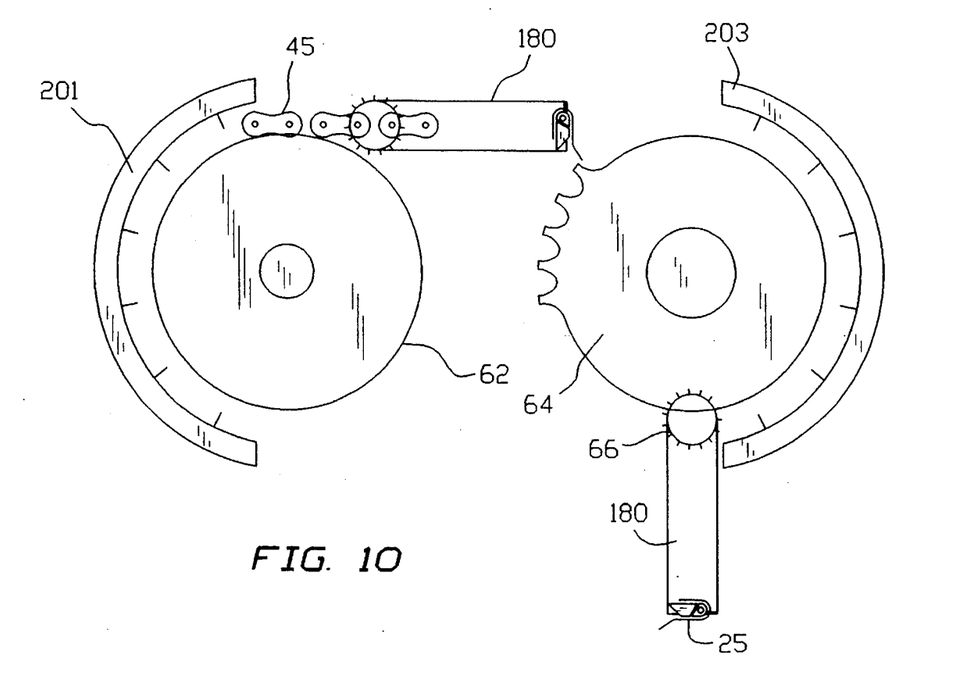
FIG. 10 is a top view of an endless belt modification for the dual web package operation.

FIG. 10 is a top view of a horizontal endless belt modification for the dual web package machine operation. The modified horizontal support body 181, disposed from the horizontal endless belt 45, moves the bag clamp devices 25 and 25' (not shown) around a loop from return sprocket 62, where bags 13' and 22' are picked up, to sprocket 64, where sealed bags 13' and 22' are retrieved from the bag clamp devices 25 and 25' for shipment processing. Adjacent to sprocket 64 is a stationary pick-off track 203 with teeth, and adjacent to return sprocket 62 is a stationary pickup track 201 with teeth. The horizontal support body 181 has a turn pin 66 with teeth which engage with the teeth on stationary tracks 201 and 203. After bags 13' and 22' are retrieved from the bag clamp devices 25 and 25', the turn pin 66 engages with the stationary track 203 to turn the horizontal support body 181 about ninety (90) degrees clockwise. As the turned horizontal support body 181 approaches return sprocket 62, the turn pin engages with stationary track 201 to turn the horizontal support body 181 about two hundred seventy (270) degrees clockwise to ready the clamp devices 25 and 25' to pick up new bags 13' and 22'. The endless belt is preferably an indexing chain. The main shaft 60 (see FIG. 1) may have cams or other advancing segments (not shown) which can activate stations which open, fill or top seal the bags 13' and 22'.

Figure 11:
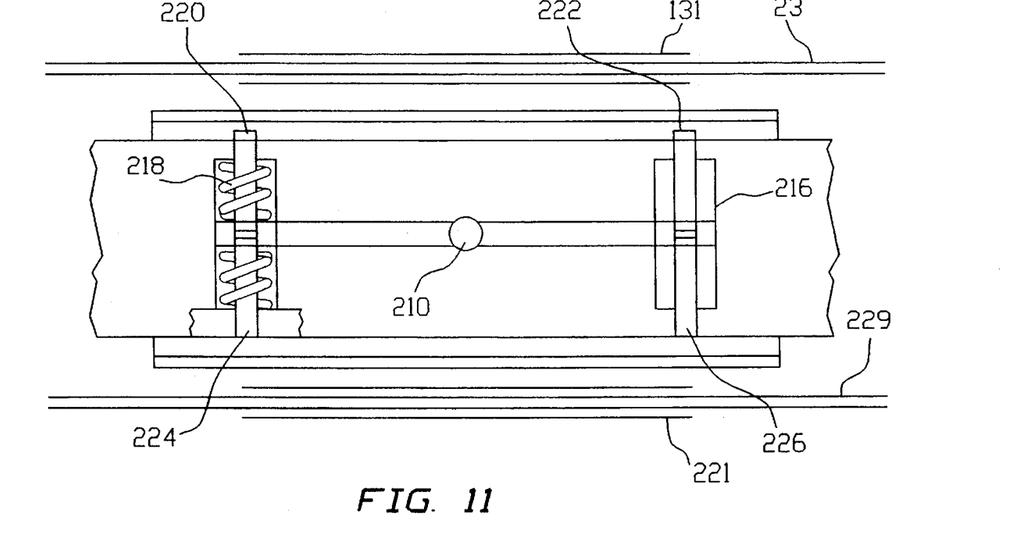
FIG. 11 is a top view of a pneumatic jet blade for dual bags.

FIG. 11 shows a top view of a pneumatically operated bag edge holding bar unit for dual package machine operation.

Top edges of bag 13' are aligned with air jet blade 23 and top edges of bag 22' are aligned with a second air jet blade 229. Pistons and rods 212 actuated by air pressure from inlet 210 push holding bars 213 and 214 against top edge of bags 13' and 22', holding these bags 13' and 22' tight to the air jet blade 23 and 229. Mechanically operated prior art holding bars (not shown) hold the top edge of bags 13' and 22' against the opposite side of air jet blades 23 and 229. When the top edges of bags 13' and 22' are held tight to the air jet blades 23 and 229, the bags are inflated by air pressure through outlets in the bottom edge of the air jet blades allowing the bag walls to be more readily pulled apart by the bag opening device described in FIG. 6. When bag inflation is achieved, air pressure to inlet 210 is redirected to inlets 216, moving pistons and rods 212 and holding bars 213 and 214, away from the top edge of bags 13' and 22'.

Figure 12:
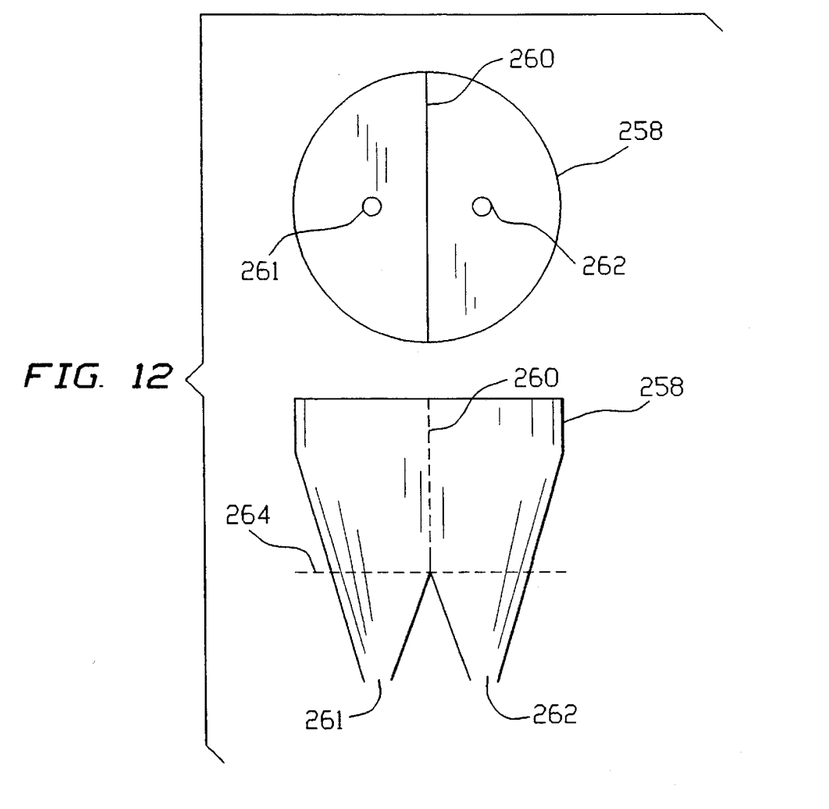
FIG. 12 is top and side views of a dual feed funnel for a dual web packaging machine; and, FIG. 13 is a side view of a dual pick off device for a dual web packaging machine.

Shown in FIG. 12 are top and side views of a dual filling device 258 for the dual web package machine. The device shown is similar to filling devices 29 and 31 with a modification at transition line 264 wherein a single funnel is replaced by dual funnel with nozzles 261 and 258 which are maintained separate by median 260. The dual funnel 258 dispenses a predetermined or metered amount of materials into bags 13' and 22'.

Figure 13:
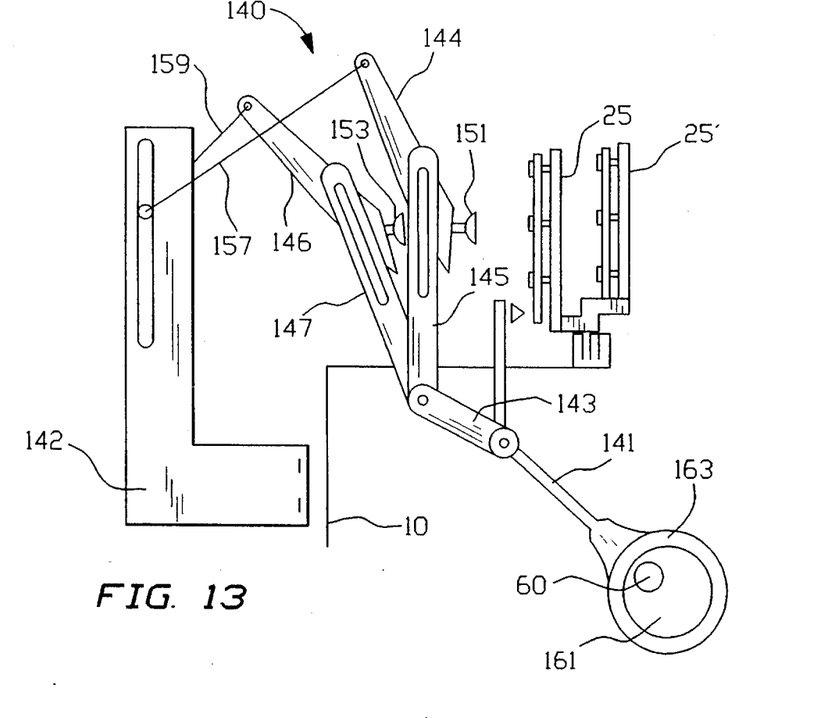

Shown in FIG. 13 is a side view of a pick-off device 140 for a dual web package machine. A coupling ring 163 is reciprocated by an eccentric sleeve 161 on main shaft 60. The coupling ring 163 has a connecting rod 141 that is connected to a connecting link 143. The connecting link 143 drives two pick-off links 145 and 147. Pick-off links 145 and 147 connect to pivoting cup brackets 144 and 146, respectively. The cup brackets 144 and 146 are pivoted by rods 157 and 159 which are connected to bracket 142. In a typical operation, as bag clamps 25 and 25' bring the bags (not shown) from the top heat sealing operation, the pick off device 140 is manipulated by main shaft 60 so as to first retrieve a bag from bag clamp 25 by suction cup 153. After the bag from bag clamp 25 is retrieved, suction cup 151 is maneuvered to retrieve the bag from bag clamp device 25'.

Obviously, numerous modifications and variations of the present invention are possible in light of the above teachings. For example, the dual web feeder roller units can be a configuration of endless belts on both sides of the folded web for gaining more frictional pull without deforming the folded web. It is therefore understood that within the scope of the appended claims, the invention may be practiced otherwise than as specifically described herein.

What is claimed is:

1. A dual web intermittent motion packaging machine for shaping, sidewall sealing, cutting, opening, filling and top sealing plural bag packages from two separate web sources, in parallel, for utilizing a first web of packaging material and a parallel moving, second web of packaging material which comprises, sequentially in-line:

(a) two web roll holder devices for feeding two separate webs of packaging material;

(b) two web folding devices for mechanically folding webs of packaging material into webs having substantially vertical sidewalls and a folded bottom;

(c) at least two side heat sealing units for sealing webs of packaging material to form sides to establish bag segments formed of said folded bottom and heat sealed sides;

(d) at least two web feeder roller units, said web feeder roller units arranged so as to separately advance said first web and said second web, each under tension, and being interconnected to one another so as to adjust speed on at least one of said feeder roller units so as to deliver each of said first web and said second web simultaneously in parallel with said heat sealed sides of each of said first web and said second web being in direct alignment with one another;

(e) a bag cutting device for cutting said first web and said second web into a plurality of separate bags;

(f) a bag clamping device having a horizontal, endless belt arrangement and having a plurality of clamping units disposed from said endless belt, each of said clamping units having at least one bag clamp for a bag from said first web and said second web;

(g) a plural bag opening device for opening bags from said first web and bags from said second web;

(h) a plural filling device with means for filling at least one for each of bags from said first web and bags from said second web, said filler devices having dispensing nozzles located above said bags and having means for intermittently dispensing predetermined amounts of materials therefrom into said bags;

(i) two top heat sealing units for sealing tops of bags from said first web and said second web; and, (j) power and control means for operating said side heat sealing devices, said web feeder roller units, said bag cutting device, said bag clamping device, said plural bag opening device, said plural filling device and said top heat sealing units together so as to function sequentially as a parallel dual web intermittent motion packaging machine.

2. The machine of claim 1 wherein said web folding devices are stationary mechanical shapers having a flat base upstream graduating to a "V" shape and then to a vertical wall shape for folding said webs into vertical walls having a solid folded bottom.

3. The machine of claim 1 wherein said side heat sealing units have a common central heat sealing unit element formed by a double heat seal element centrally located between outside heat seal elements and between a path of movement of said first web and said second web.

4. The machine of claim 3 said outside elements are cycleably moveable to and against said common central element, said bags from said first web and said second web being simultaneously sealable by said outside elements cycling to and against said common central element.

5. The machine of claim 1 wherein said power and control means includes a single drive motor for said web feeder roller units and includes separate clutches for each of said web feeder roller units for adjusting speed of said first web relative to speed of said separate web.

6. The machine of claim 1 wherein said power and control means includes at least one photoelectric eye device for reading marks of webs so as to signal adjustments to said web feeder roller units to create alignment of said heat sealed sides of said first web and said second web.

7. The machine of claim 3 wherein said power and control means includes at least one photoelectric eye device for reading marks of webs so as to signal adjustments to said web feeder roller units to create alignment of said heat sealed sides of said first web and said second web.

8. The machine of claim 4 wherein said power and control means includes at least one photoelectric eye device for reading marks of webs so as to signal adjustments to said web feeder roller units to create alignment of said heat sealed sides of said first web and said second web.

9. The machine of claim 5 wherein said power and control means includes at least one photoelectric eye device for reading marks of webs so as to signal adjustments to said web feeder roller units to create alignment of said heat sealed sides of said first web and said second web.

10. The machine of claim 1 wherein said bag cutting device has dual blades which simultaneously cut said first web and said second web to form cut bags simultaneously.

11. The machine of claim 1 wherein said bag opening device includes dual air blades for simultaneously opening at least one bag from each of said first web and said second web.

12. The machine of claim 1 wherein said bag opening device includes bag holding bars for bags from said first web and bags from said second web.

13. The machine of claim 11 wherein said bag opening device includes bag holding bars for bags from said first web and bags from said second web.

14. The machine of claim 12 wherein said bag holding bars have vacuum areas for holding bags, said vacuum areas being pneumatically operated.

15. The machine of claim 13 wherein said bag holding bars have vacuum areas for holding bags, said vacuum areas being pneumatically operated.

16. The machine of claim 1 wherein said bag clamping device has a horizontal endless belt operating in a loop, said bag clamping device carrying each of said bags from said first web and each of said bags from said second web to said plural bag opening device, said plural filling device and said top heat sealing units.

17. The machine of claim 16 wherein said horizontal endless belt includes at least an endless indexing chain.

18. The machine of claim 16 wherein said plurality of clamping units are evenly disposed from said horizontal endless belt, said clamping units including bag clamp vertical support bodies with lever activated pivoting cam rods for clamping and unclamping said bags.

19. The machine of claim 1 wherein said plural filling device includes plural funnels, including at least one metered dispensing funnel for bags from each of said first web and said second web.

20. The machine of claim 1 wherein said plural filling device is formed from a single funnel having a split outlet with dual dispensing nozzles.

* * * * *